United States Patent
McCarty et al.

(10) Patent No.: US 6,868,492 B1
(45) Date of Patent: Mar. 15, 2005

(54) METHODS AND APPARATUS FOR BOOTING A HOST ADAPTER DEVICE DEVOID OF NONVOLATILE PROGRAM MEMORY

(75) Inventors: Christopher J. McCarty, Colorado Springs, CO (US); Stephen B. Johnson, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 670 days.

(21) Appl. No.: 09/910,088

(22) Filed: Jul. 20, 2001

(51) Int. Cl.[7] ............................................. G06F 9/445
(52) U.S. Cl. .................. 713/1; 713/1; 713/2; 713/100; 710/2; 710/3; 710/6; 710/10; 710/36; 710/104
(58) Field of Search ............................. 713/1, 2, 100; 710/2, 3, 6, 10, 36, 104

(56) References Cited

U.S. PATENT DOCUMENTS

| | | | | |
|---|---|---|---|---|
| 5,589,987 A | * | 12/1996 | Tanaka | 359/701 |
| 5,854,905 A | * | 12/1998 | Garney | 710/104 |
| 6,092,190 A | * | 7/2000 | Lee | 713/2 |
| 6,158,002 A | * | 12/2000 | Kwan et al. | 713/2 |
| 6,173,344 B1 | * | 1/2001 | Mohammed et al. | 710/62 |
| 6,282,647 B1 | * | 8/2001 | Leung et al. | 713/100 |
| 6,446,139 B1 | * | 9/2002 | Leung et al. | 710/1 |
| 6,466,994 B1 | * | 10/2002 | Burke et al. | 710/8 |
| 6,560,641 B1 | * | 5/2003 | Powderly et al. | 709/219 |
| 6,654,845 B1 | * | 11/2003 | Morris et al. | 710/305 |
| 2003/0156383 A1 | * | 8/2003 | Jenkins et al. | 361/683 |

FOREIGN PATENT DOCUMENTS

EP         335812 A   * 10/1989   ............ G06F/9/44

* cited by examiner

*Primary Examiner*—A. Elamin
*Assistant Examiner*—Nitin C. Patel
(74) *Attorney, Agent, or Firm*—Duft Setter Ollila & Bornsen LLC (57) ABSTRACT

Methods and associated structure for booting host adapter devices in a system where the host adapter devices are devoid of independent, nonvolatile memory devices for storage of programmed instructions operable within the intelligent host adapter device. The operational programmed instructions for the intelligent host adapter device are stored in the nonvolatile memory of the system motherboard along with the standard BIOS code of the system. The intelligent host adapter device operational programmed instructions are then downloaded by the BIOS code into the host adapter's volatile local program memory to initialize operation of the intelligent host adapter device. Further, device driver code operable in the operating system on the motherboard will upload the previously downloaded programmed instructions from the intelligent host adapter so that the programmed instructions may be reloaded to the host adapter in response to reset conditions, power management events, and other conditions.

20 Claims, 3 Drawing Sheets

METHODS AND APPARATUS FOR BOOTING A HOST ADAPTER DEVICE DEVOID OF NONVOLATILE PROGRAM MEMORY

BACKGROUND OF THE INVENTION

1. Field of the Invention

The invention relates to intelligent or programmable host adapter devices used in computing systems for interfacing to peripheral devices. In particular, the present invention relates to methods and associated structures for downloading and uploading programmed instructions to such an intelligent host adapter device devoid of dedicated nonvolatile program memory.

2. Discussion of Related Art

Present computing systems are typically structured with a motherboard on which a variety of system components are mounted and one or more host adapter devices for interfacing the motherboard to peripheral devices such as I/O peripheral devices. The host adapter device provide electronic circuits and logic to adapt signals on the motherboard bus to signals appropriate for a particular peripheral device. For example, a host adapter device may adapt signals on a motherboard PCI bus for exchange with I/O peripheral devices attached to a SCSI bus.

In the past, host adapter devices lacked "intelligence"—in other words, they were not in general programmable devices. Operation of the device depended upon programmed instructions operable within the general-purpose processor (CPU) of the motherboard. When the motherboard was initialized (booted), programmed instructions operating in the CPU would initialize the host adapter devices coupled to the motherboard. Ongoing operation of the host adapter devices also depended upon programmed instructions operable within the general-purpose CPU of the motherboard (i.e., device driver software provided all operational control of the host adapter devices).

As computing technology has evolved, host adapter devices have evolved into programmable devices that operate in accordance with their own programmed instructions independent of instructions operable within the general-purpose CPU of an associated motherboard. In other words, in addition to initializing programmed instructions for operation of the general-purpose CPU of the motherboard, initial program instructions (i.e., boot code) must be provided to any associated, intelligent, programmable host adapter devices.

The general-purpose CPU of the motherboard is in general initialized through programmed instructions stored in nonvolatile memory of the motherboard and usually referred to by the acronym BIOS. A nonvolatile memory device such a ROM, PROM, EPROM, EEPROM or Flash Memory typically stores the initial program instructions (BIOS) for the motherboard operation at bootup. Heretofore, boot code for intelligent host adapter devices has been stored in an additional nonvolatile memory device associated with the host adapter device. Physically, this additional nonvolatile memory device was positioned in close proximity to the host adapter device. For example, where the host adapter device was mounted on the motherboard (integrated on the motherboard), the host adapter device's additional nonvolatile memory was also mounted on the motherboard. In the alternative, the additional nonvolatile memory device may be mounted on a separate host adapter board when the host adapter device is itself a separate printed circuit board distinct from the motherboard.

Addition of a nonvolatile memory device dedicated to use by an associated host adapter device adds cost and complexity to a system design. In other words, each host adapter device mounted on a motherboard design requires a nonvolatile memory device for storing its operational programmed instructions typically distinct from the BIOS nonvolatile memory of the motherboard. For a complex, feature-rich motherboard, a significant number of such nonvolatile memory devices may be required as optional host adapter devices are added to a motherboard design. Similarly, where a host adapter device is configured as an independent printed circuit board (i.e., a host adapter board), addition of a nonvolatile memory for storage of programmed instructions for each particular host adapter board adds cost and complexity to the design of that host adapter board.

It is evident from the above discussion that a need exists for methods and associated structure for initializing a host adapter device with operational programmed instructions without requiring the added complexity and associated cost of an additional nonvolatile memory device for each host adapter device. In particular, it is desirable to eliminate additional nonvolatile memory devices added to a motherboard design, each corresponding to an additional host adapter device mounted on the motherboard.

SUMMARY OF THE INVENTION

The present invention solves the above and other problems, thereby advancing the state of the useful arts, by providing methods and associated structure for booting a host adapter device without requiring an additional nonvolatile memory device for storing operational programmed instructions for the host adapter device. Specifically, the present invention provides that the programmed instructions for a host adapter device are stored in the nonvolatile memory in which the BIOS code of the motherboard is stored. The standard BIOS code associated with every motherboard design includes programmed instructions to be executed by the general-purpose processor of the motherboard for performing low level interfacing with each supported host adapter device. Where a host adapter device is intelligent and therefore requires programmed instructions to be downloaded for its normal operation, those programmed instructions are stored as data within the nonvolatile memory device containing the BIOS code. Through a sequence of steps in accordance with the present invention, the BIOS code operating on the general-purpose processor of the motherboard downloads the operational programmed instructions for the intelligent host adapter into the host adapter's volatile program memory. In addition, the present invention provides that device driver code in the operating system operable on the motherboard's general-purpose CPU uploads the host adapter's operational programmed instructions from the host adapter volatile program memory so that we program memory of the host adapter may be restored when the host adapter is reset in accordance with operation of the operating system (i.e., in response to power management operations or other events).

In a first aspect of the invention, the invention provides for a method for booting a host adapter device devoid of dedicated non-volatile program memory, wherein said host adapter device is associated with a motherboard having BIOS code stored in a non-volatile memory, and where the method comprising the steps of: retrieving operational programmed instructions for the host adapter device from the non-volatile memory device; downloading the operational programmed instructions from to a memory associated with the host adapter device; and commencing operation of the host adapter device executing the operational programmed instructions.

A second aspect of the invention includes the steps of: retrieving data associated with the operational programmed instructions from the non-volatile memory device; and downloading the data to the memory.

Another aspect of the invention provides for uploading the previously downloaded operational programmed instructions from the volatile memory in the host adapter device to a memory in the motherboard. Other aspects then provide for: detecting an occurrence of a condition that resets the host adapter device; and downloading the previously uploaded operational programmed instructions from the memory in the motherboard to the host adapter device in response to detecting the condition.

These and other features, aspects and benefits of the present invention will be readily apparent to those skilled in the art through a more careful reading of the following description and associated drawings as follows.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
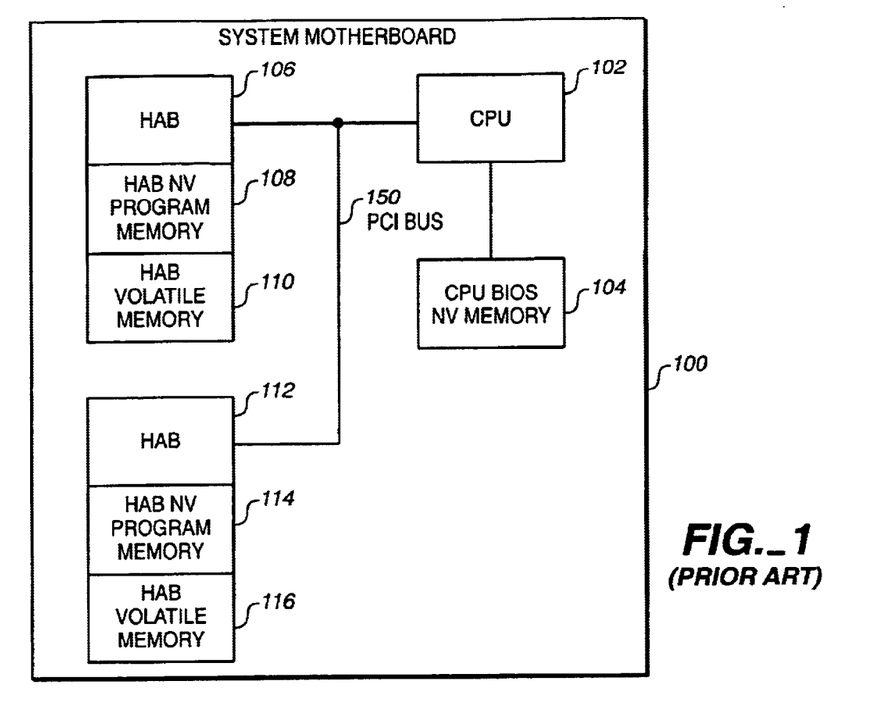
FIG. 1 is a block diagram of a typical system configuration as presently known in the art.

FIG. 1 is a block diagram of a typical computing system motherboard as presently practiced in the art. System motherboard 100 includes general-purpose processor 102 (CPU) for performing computing functions of the system. Nonvolatile memory 104 is coupled to CPU 102 and contains BIOS code for initial operation of system motherboard 100. In general, CPU 102 initializes its processing (i.e., "boots") by executing the BIOS programmed instructions fetched from nonvolatile memory 104. As is commonly known in the art, CPU 102 interacts with peripheral device controllers (also commonly referred to as host adapter boards or host adapter devices or simply host adapters) via a PCI bus 150 or other standard interface buses. Host adapter 106 and host adapter 112 are exemplary of such peripheral device controllers coupled to CPU 102 via PCI bus 150.

As noted above, as computing power has evolved, host adapter devices 106 and 112 have incorporated increasingly more computational capabilities including programmability that fetches and executes programmed instructions independent of CPU 102. Such processing power in a host adapter is often referred to as an I/O processor or IOP. The programmed instructions for an IOP in a host adapter are fetched from a memory associated with the host adapter. As shown in FIG. 1, host adapter 106 includes its own nonvolatile program memory 108 for storage of programmed instructions in addition to volatile memory 110 for storage of associated data and operating programmed instructions (typically copied from the nonvolatile, slower memory 108). In like manner, host adapter 112 is depicted with its independent nonvolatile program memory 114 and a volatile memory 116.

Nonvolatile programmed memories 108 and 114 store programmed instructions for execution by the associated IOPs of host adapters 106 and 112, respectively. As noted above, a requirement that each host adapter device 106 and 112 include its own independent nonvolatile program memory 108 and 114 adds complexity and hence associated costs to the design of host adapter devices. In particular, as shown in FIG. 1, host adapter devices integrated into a system motherboard 100 may require the addition of numerous independent nonvolatile program memory devices —one associated with each host adapter device integrated into the motherboard.

Figure 2:
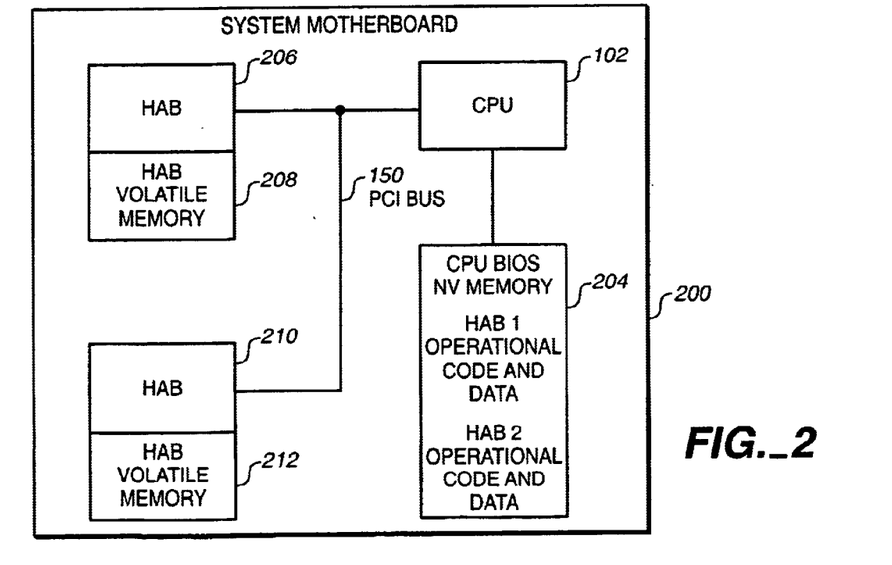
FIG. 2 is a block diagram of a system in accordance with the present invention wherein host adapter devices are devoid of program memory and downloaded from BIOS memory of the motherboard.

FIG. 2 is a block diagram of an improved system motherboard 200 incorporating the advances of the present invention. System motherboard 200 includes general-purpose processor 102 and PCI bus 150 for coupling CPU 102 to host adapters. Improved system motherboard 200 includes a nonvolatile program memory storing BIOS programmed instructions for execution by CPU 102. Unlike prior techniques depicted in FIG. 1, nonvolatile program memory 204 includes storage space devoted to storage of operational code and data for each host adapter associated with the motherboard. The programmed instructions for a host adapter and the associated data is stored in otherwise unused space of the nonvolatile memory 204 of the motherboard 200. This architecture of the present invention permits host adapter devices to be incorporated into the motherboard without necessity of adding dedicated nonvolatile memory devices associated with each host adapter device. Specifically, host adapter device 206 is devoid of any dedicated nonvolatile program memory and instead includes only volatile memory 208 for use by the IOP of host adapter 206. In like manner, host adapter 210 is devoid of nonvolatile dedicated program memory and includes only the volatile memory used for operation of host adapter 210.

Methods of the present invention as discussed below provide for downloading operational code and associated data from nonvolatile program memory 204 through CPU 102 and PCI bus 150 into each integrated host adapter. In particular, operational code and associated data for a first host adapter 206 is downloaded by operation of CPU 102 through PCI bus 150 from nonvolatile program memory 204 into host adapter volatile memory 208. In like manner, operational code and data for the second host adapter device is downloaded by operation of CPU 102 via PCI bus 150 into host adapter volatile memory 212. Storage of the host adapter operational code and data in the motherboard's nonvolatile program memory 204 obviates the need for additional nonvolatile program memory devices associated with each host adapter integrated into the motherboard design or added to a host adapter board.

Those skilled in the art will readily recognize that host adapters 206 and 210 are intended to represent a host adapter device integrated into the motherboard design as well as a host adapter designed as an external printed circuit board. In other words, host adapter as used herein is intended to include both host adapter devices integrated with a motherboard design and host adapter boards designed to be independent of the motherboard printed circuit board and inserted into a PCI bus socket for coupling to CPU 102.

Further, those skilled in the art will readily recognize that the block diagrams of both FIGS. 1 and 2 are intended merely as representative of essential elements relevant to the present invention. Numerous other components and devices are required in motherboard designs and are well-known to those skilled in the art.

Methods of the present invention provide for downloading (and uploading) of programmed instructions and data from (and to) a nonvolatile memory on the motherboard.

A motherboard CPU (running BIOS code) preferably communicates with the intelligent coprocessor through the use of the System Interface registers. Access to these registers is provided via memory and/or I/O mapping in accordance with the PCI bus standard specifications. The first memory Base Address Register in PCI Configuration Space and the first I/O Base Address Register in PCI Configuration Space preferably identify the location of the System Interface register set. Registers relevant to the preferred embodiment of the present invention include the following:

| 31  3  24 23  2  16 15  1  8 7  0  0 | byte |
|---|---|
| Reserved | 00 h |
| Write Sequence | 04 h |
| Host Diagnostic | 08 h |
| Reserved | 0Ch |
| DiagRwData | 10 h |
| DiagRwAddress | 14 h |
| Reserved | 18 h |
|  | ... |
|  | 7Fh |

These registers are preferably defined with the following meaning and usage:

| Register Name | Attributes | Description |
|---|---|---|
| Write Sequence | Write Only | The Write Sequence Register provides a protection mechanism against inadvertent writes to the Host Diagnostic register. A sequence of 5 data-specific writes must be written into the Write Sequence KEY_VALUE field in order to enable writes to the Host Diagnostic register. Any data value written incorrectly will cause the Write Sequence register to restart by looking for the first sequence value. The required data sequence is: 0x4, 0xB, 0x2, 0x7, 0xD After the last value (0xD) is written, the Host Diagnostic register may be written to until another write occurs to the Write Sequence Register (of any value). A bit is provided in the Diagnostic register, DRWE, which indicates if write access has been enabled for the Diagnostic register (e.g. to verify that the Write Sequence data sequence was correct or to verify that writes to the Diagnostic register have been disabled). There is one Write Sequence register which is visible to both but physically shared between the two PCI Functions. Bits 31:4 Reserved Bits 3:0 KEY_VALUE |
| Host Diagnostic | Read/Write | The Diagnostic register contains low-level diagnostic control and status. Bits 31:11 Reserved Bit 10 Clear Flash Bad Signature (see Note 1) Bit 9 Prevent IOC Boot (see Note 1) This bit, when set to '1', prevents the IOC from booting. This is used as a part of the FWDownloadBoot algorithm (section Error! Reference source not found.) when the IO Unit does not have a dedicated FLASH ROM. Bit 8 Reserved |

-continued

| Register Name | Attributes | Description |
|---|---|---|
| | | Bit 7 DRWE (Diagnostic Register Write Enabled) This bit, when set to '1', indicates that write access to the Host Diagnostic register may occur. This bit is set after writing the correct key sequence into the Write Sequence register. Bit 6 Flash Bad Signature This bit, when set to '1', indicates that the IOC was unable to boot from FLASH ROM. When this occurs, the Disable Arm bit in this register is set to '1' until both the FlashBadSignature and the Disable Arm conditions are cleared by the Host. Bit 5 ResetHistory This bit when set to '1' indicates that a physical reset has occurred within the IOC. This bit may be written to '0' by a Host driver to help coordinate error/reset recovery between multiple driver instances in a multi-function PCI implementation. Bits 4 DiagRwEnable (see Note 1) This bit when set to '1' allows I/O access to the DiagRwData and DiagRwAddress registers. Bit 3 Reserved Bit 2 Reset Adapter This write-only bit will cause a Soft Reset condition within the chip. The bit will be self-cleared after 8 PCI clock periods. After this bit is reset the IOC will start its initialization sequence. Bit 1 Disable Arm When set to '1' this bit causes the IOC to be held in reset. This is primarily used to enable downloading of firmware and data by a host-resident agent. Bit 0 DiagMemEnable When set to '1' enable Diagnostic Memory accesses via PCI Memory 1 address space. If writes/reads to Memory 1 space are attempted with this bit cleared to '0', they will be properly terminated on the PCI bus but be NOP'd by the chip. |

In the preferred embodiment, the code and data to be loaded to each host adapter is stored in a data structure in the nonvolatile memory with header information as follows:

Firmware Image and Header

| 31  3  24 23  2  16 15  1  8 7  0  0 | | byte |
|---|---|---|
| IOP Branch Instruction | | 00 h |
| Signature (0 x 5AEAA55A) | | 04 h |
| Signature (0 x A55AEAA5) | | 08 h |
| Signature (0 x 5AA55AEA) | | 0Ch |
| IOP Branch Instruction | | 10 h |
| IOP Branch Instruction | | 14 h |
| Reserved | | 18 h |
| Checksum | | 1Ch |
| ProductId | VendorId | 20 h |
| Reserved | FWVersion | 24 h |
| SeqCodeVersion | | 28 h |
| ImageSize | | 2Ch |
| Reserved | | 30 h |
| LoadStartAddress | | 34 h |
| IopResetVectorValue | | 38 h |
| IopResetVectorRegAddr | | 3Ch |
| VersionNameWhat | | 40 h |

| | |
|---|---|
| VersionName | 44 h |
| | 48 h |
| | 4Ch |
| | 50 h |
| | 54 h |
| | 58 h |
| | 5Ch |
| | 60 h |
| VendorNameWhat | 64 h |
| | 68 h |
| | 6Ch |
| | 70 h |
| VendorName | 74 h |
| | 78 h |
| | 7Ch |
| | 80 h |
| | 84 h |
| Filmware Loader, Code and Data | 88 h |
| ... | |

| Fields | |
|---|---|
| Checksum | The checksum of the entire image with the checksum field assuming a value of zero when calculating the checksum. |
| VendorId | The unique ID of the manufacture or Vendor. |
| ProductId | Unique vendor assigned product identifier. This is the same as the ProductID in the IOCFacts Reply message. |
| FWVersion | The FW version, the field is broken up into 2 sub-fields of major and minor both being 8 bits wide. This matches the value in the IOCFacts Reply message. |
| SeqCodeVersion | Firmware Sequencer Code version. |
| ImageSize | The size of the entire image in bytes. |
| LoadStartAddress | The starting address the image is to be copied in C1030 local memory. Value to be loaded in the DiagRw Address register. |
| IopResetVectorValue | The absolute start address of the IOP. The value to be loaded in the IopResetVector register. |
| IopResetVectorRegAddr | The address of the IopResetVector register. |
| VersionNameWhat | Marker value for the what utility. |
| VersionName | The ASCII text string of the Version |
| VendorNameWhat | Marker value for the what utility. |
| VendorName | The ASCII text string of the Vendor or manufacturers name. |

Data Image and Header

| 31   3 | 24 23   2 | 16 15   1 | 8 7   0 | 0 | byte |
|---|---|---|---|---|---|
| Signature (0 x 43504147, "CPAG") | | | | | 00 h |
| Length | | FunctionNumber | | | 04 h |
| Checksum | | | | | 08 h |
| LoadStartAddress | | | | | 0Ch |
| Config Pages | | | | | 10 h |
| ... | | | | | |

| Fields | |
|---|---|
| FunctionNumber | The PCI function number. |
| Length | The length in bytes of the entire image. |
| Checksum | The checksum of the entire image with the checksum field assuming a value of zero when calculating the checksum. |
| LoadStartAddress | The starting address the data image is to be copied in the IOC local memory. This value is loaded into the DiagRw Address register. |

Those skilled in the art will recognize that the above data structures, header fields and System Interface registers are merely exemplary of typical information provided in such file structures and such register interfaces. A variety of equivalent registers, fields and structures will be readily apparent to those skilled in the art. In particular, the PCI bus (as well as other standard buses) permit mapping of addresses between the motherboard's PCI bus and devices attached to the PCI bus. Key to the invention is the broader idea that the motherboard downloads operational programmed instructions ("firmware") for ongoing operation of the host adapter. The System Interface registers defined above are but one exemplary preferred embodiment for enabling the download of host adapter firmware. In like manner, the header structures described above are not a necessary element of the invention but rather are exemplary structures useful to identify parameters of the firmware to be downloaded.

Figure 3:
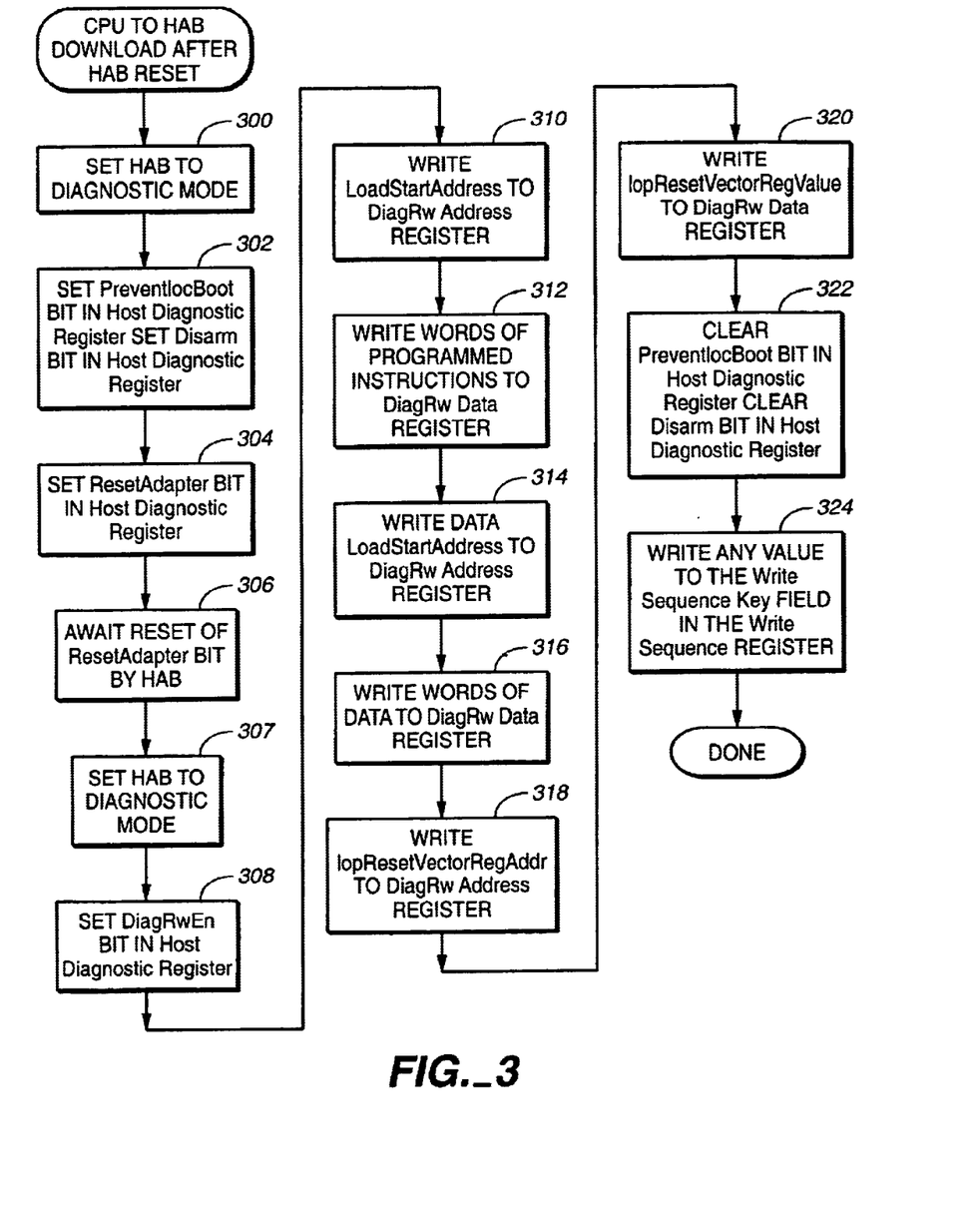
FIG. 3 is a flowchart describing a method to download the operational programmed instructions to a host adapter device in accordance with the present invention.

FIG. 3 is a flowchart describing operation of the general purpose CPU on a motherboard to download operational code and data to an intelligent host adapter devoid of nonvolatile program memory and associated with the motherboard. In the preferred embodiment of the present invention, System Interface registers discussed above are used to permit the CPU of the motherboard to directly access the volatile memory associated with a host adapter device. The motherboard CPU therefore copies programmed instructions and associated data for a host adapter to into the volatile memory associated with the host adapter through the PCI bus using the System Interface registers discussed above. Those skilled in the art will also recognize that other standard bus structures permit similar direct memory access (i.e., memory mapped access) to memory devices associated with peripheral controllers. Such memory mapped I/O interfacing is well-known to those skilled in the art. Key to the present invention is use of such memory mapped techniques for downloading (and uploading) programmed instructions and associated data to (and from) host adapter volatile memory.

Element 300 is first operable to set the host adapter device into a diagnostic mode by appropriate programming of System Interface registers associated with the host adapter. This diagnostic mode permits access to other programmable registers and access to the volatile memory of the host adapter. Element 302 is next operable to set appropriate bits in the host diagnostic register of the host adapter to prevent initial booting of the I/O processor associated with the host adapter and to hold the I/O processor in a halted or reset state. The host adapter I/O processor is prevented from booting until after completion of the method FIG. 3 to download programmed instructions and associated data to the host adapter volatile memory.

Element 304 next sets an appropriate bit in the host diagnostic register of the host adapter to force a reset of the host adapter I/O processor. Element 306 then awaits clearing of the reset bit in the host diagnostic register of the host adapter. The host diagnostic register as defined above preferably provides for such a reset bit and clearing of the reset bit when the host adapter circuits have completed reset procedure. Element 307 then sets the host adapter back into diagnostic mode (cleared by the reset operation of element 306). Element 308 next sets an appropriate bit in the host diagnostic register to enable diagnostic mode read/write access to the volatile memory of the host adapter.

Elements 310 through 316 are then operable to download programmed instructions for the host adapter as retrieved from the nonvolatile memory containing the BIOS code of the motherboard. Specifically, element 310 first writes the starting load address of the programmed instructions into the diagnostic read/write address register of the host adapter. Element 312 then writes into the diagnostic read/write data register of the host adapter each word of the programmed instructions fetched from the BIOS nonvolatile memory of the motherboard. Each word of the programmed instructions is written sequentially to the diagnostic read/write data register until all of the programmed instructions are successfully loaded into the volatile memory of the host adapter. In like manner, elements 314 and 316 are operable to download the associated data to the host adapter volatile memory. Specifically, element 314 writes the starting load address of the data portion into the diagnostic read/write address register and element 316 writes each word of the associated data to the diagnostic read/write data register of the host adapter. As noted above, the System Interface diagnostic read/write address and data registers preferably provide for automatically incrementing the address for storage of each sequential word in a next address starting with the load address provided in the diagnostic read/write address register.

Element 318 is next operable to store the address of the vector used to start execution of the I/O processor of the host adapter. The address of the vector is written to the diagnostic read/write address register. Element 320 then stores the value of this reset vector in the diagnostic read/write data register for storage in the host adapter volatile memory. Element 322 next clears the appropriate bits in the host diagnostic register that were preventing booting of the I/O processor of the host adapter and holding the I/O processor in a reset condition. Clearing of these bits permits the I/O processor of the host adapter to commence execution of the downloaded programmed instructions and associated data. Lastly, element 324 writes any value to the write sequence key field in the write sequence register of the host adapter. This last step serves to reset the host adapter from the previously entered diagnostic mode.

Those skilled in the art will readily recognize that a variety of equivalent steps may be used to download information into host adapter volatile memory by operation of the motherboard CPU. Further, as noted above, those skilled in the art will recognize a variety of equivalent methods associated with other standard bus structures to permit direct memory access by the motherboard CPU to memory devices associated with the host adapter I/O processor.

FIG. 3 describes the processing of the motherboard CPU in BIOS code execution to initially download the programmed instructions and associated data into the host adapter volatile memory. As noted above, once so loaded the information could be lost if the host adapter is reset by normal operation of the system such as power management features. A second aspect of the invention therefore provides that the motherboard uploads the content of the previously downloaded memory after the motherboard completes the boot operations of the operating system in use. Device drivers of the operating system therefore perform processing in cooperation with the host adapter to upload the previously downloaded memory image.

Figure 4:
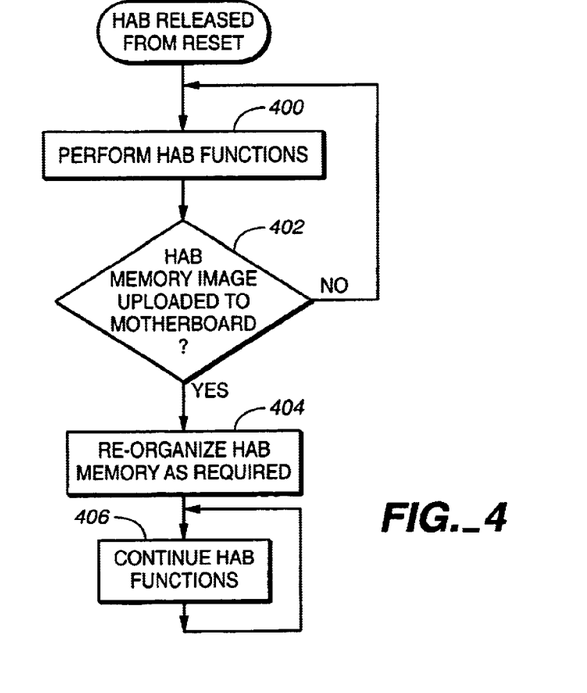
FIG. 4 is a flowchart describing operation of the host adapter device of the present invention following completion of the download of its operational programmed instructions.

FIG. 4 is a flowchart describing the operation of the host adapter after completion of the download of code and associated data to cooperate with the CPU of the motherboard in uploading the previously downloaded memory image. Element 400 is representative of standard I/O processing functions performed by the host adapter. Standard I/O processing functions includes all processing required to receive and perform I/O operations requested by the motherboard CPU for attached peripheral devices. Element 402 is operable to determine whether the memory image (programmed instructions and associated data) loaded in the volatile memory of the host adapter and presently executing by the host adapter I/O processor has been uploaded to the motherboard for retention and reloading of the host adapter as required. If the memory image has not yet been uploaded by the motherboard, processing continues by looping back to element 400 to continue performing standard I/O processing functions within the host adapter. When element 402 determines that the motherboard has successfully uploaded the memory image of the previously downloaded programmed instructions and associated data, processing continues at element 404 to reorganize host adapter volatile memory as required to optimize performance. Prior to successful uploading of the host adapter programmed instructions data, the host adapter may operate in a degraded mode to assure robust processing of the requested I/O operations. Memory reorganization may be appropriate depending on the particular function and application of a particular host adapter and need not be further address here. Following completion of any required memory reorganization, element 406 is then operable to continue processing appropriate to I/O functions of the host adapter I/O processor.

As noted above, the present invention further provides for uploading previously downloaded firmware from the host adapter to the motherboard. Since the host adapter of the present invention is preferably devoid of non-volatile program memory, a technique is provided by the present invention to upload the firmware from the host adapter's volatile memory to storage associated with the motherboard. As noted above, in the preferred embodiment, following booting of the motherboard CPU using BIOS code, the operating system device drivers responsible for controlling the host adapter upload the programmed instructions and data memory image so that reset or power management features applied to the host adapter that may erase the previously downloaded programmed instructions and data may perform a subsequent download of the saved memory image.

In the preferred embodiment, a device driver in the operating system operable on the motherboard would request the upload of the host adapter's firmware. At the time of such an upload request, the host adapter is presently operating according to the downloaded firmware. A PCI bus normally permits direct memory access by the host adapter to areas of motherboard memory. Therefore, in the preferred embodiment, a firmware upload procedure is implemented as a single command from the motherboard to the host adapter requesting that the host adapter copy its memory contents to specified memory of the motherboard. Preferably, thus upload request provide the memory address within the motherboard to which the host adapter copies its memory contents. Such a memory address is preferably specified by a scatter/gather list or other design choices well-known to those skilled in the art.

In this preferred embodiment, the host adapter retains control over access to its local volatile memory rather than allowing the motherboard to manipulate the memory on the host adapter while the host adapter is executing its programmed instructions.

Figure 5:
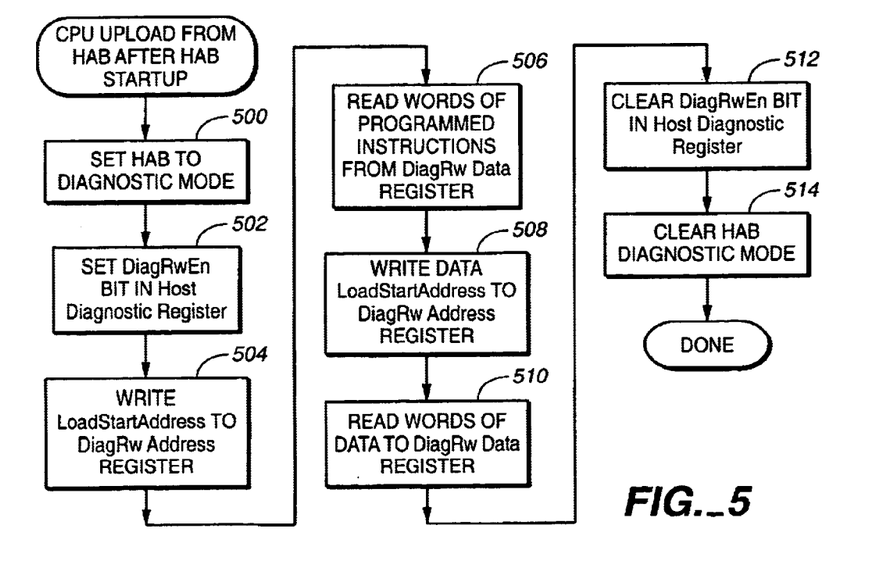
FIG. 5 is a flowchart describing an alternative embodiment for uploading previously downloaded operational programmed instructions from the host adapter to the motherboard.

In the alternative, an upload method may be provided that is driven by the motherboard directly accessing the memory on the host adapter. FIG. 5 is a flowchart describing an alternate method operable on the motherboard to upload the previously downloaded programmed instructions and code from the host adapter. The upload process of FIG. 5 is, in essence, a simpler mirror image of the download process described above with respect to FIG. 3.

Element 500 is first operable to set the host adapter into a diagnostic mode to permit direct memory access by the CPU on the motherboard to the host adapter volatile memory presently downloaded with programmed instructions and associated data. Element 502 is then operable to set an appropriate bit in the host diagnostic register of the host adapter to enable diagnostic mode read/write access to the memory of the host adapter. Elements 504 through 510 are then operable in a manner analogous to elements 310 through 316 except they read or retrieve information from the designated starting load address of the programmed instructions previously downloaded and the associated data previously downloaded the host adapter. When the upload of programmed instructions and associated data by operation of elements 504 through 510 is completed, element 512 is next operable to clear the appropriate bit in the host diagnostic register previously set to enable diagnostic mode read/write access to the volatile memory of the host adapter by the CPU of the motherboard via the PCI bus. Lastly, element 514 is operable to clear the previously set diagnostic mode of the host adapter thereby returning the host adapter to normal I/O processing functions.

As above with respect to the download processing method, those skilled in the art will readily recognize a variety of equivalent techniques to perform an uploading process through interface registers and commands over the PCI bus. Further, those skilled in the art will recognize similar methods for uploading previously downloaded programmed instructions and data from peripheral device controllers coupled to the CPU of the motherboard by other standard bus interface connections.

In still another alternate embodiment, the need for uploading may be obviated by the device driver of the operating system incorporating a copy of the firmware and data to be downloaded to the I/O processor. The firmware and data image stored within the device driver is used to download the operational program instructions into the I/O processor in response to power management or other reset events relating to the host adapter. Unlike the solutions proposed above, this alternative raises issues relating to version control and consistency. The initial download of the host adapter by the BIOS code in the motherboard could be a different version that that embedded within the device driver for downloading after power management events and other reset conditions. The preferred methods discussed above alleviate this concern by uploading the firmware presently operating within the host adapter.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for booting a host adapter device devoid of dedicated non-volatile program memory, wherein said host adapter device is associated with a motherboard having BIOS code stored in a non-volatile memory, said method comprising the steps of:

retrieving operational programmed instructions for said host adapter device from said non-volatile memory device of said motherboard;

downloading said operational programmed instructions from said motherboard to a volatile memory associated with said host adapter device;

commencing operation of said host adapter device executing said operational programmed instructions to thereby boot said host adapter device;

uploading said operational programed instructions from said volatile memory in said host adapter device to a memory in said motherboard.

2. The method of claim 1 further comprising the steps of:

retrieving data associated with said operational programmed instructions from said non-volatile memory device; and downloading said data from said motherboard to said volatile memory.

3. The method of claim 1 wherein said host adapter device is coupled to said motherboard via a PCI bus and wherein the step of downloading comprises the steps of:

forcing said host adapter device into a diagnostic mode via said PCI bus; and writing said operational programmed instructions into said volatile memory using direct memory access by said motherboard to said volatile memory via said PCI bus, and wherein the step of commencing includes the step of:

releasing said host adapter device from said diagnostic mode via said PCI bus.

4. The method of claim 3 wherein the step of forcing comprises the steps of:

setting a PreventIopBoot bit in a Host Diagnostic Register of said host adapter device;

setting a ResetAdapter bit in the Host Diagnostic Register;

awaiting clearing of the ResetAdapter bit in the Host Diagnostic Register; and setting a DiagRwEn bit in the Host Diagnostic Register.

5. The method of claim 3 wherein the step of releasing further comprises the steps of;

writing an IopResetVectorRegAddr for operation of said operational programmed instructions in a DiagRw Address register of said adapter device;

writing an IopResetVectorValue for operation of said operational programmed instructions in a DiagRw Data register of said adapter device;

clearing the PreventIopBoot bit in the Host Diagnostic Register; and writing any byte value in a Write Sequence Key field in a Write Sequence register of said adapter device.

6. The method of claim 3 wherein the step of downloading said operation programmed instructions includes the steps of:

writing a load start address of said operational programmed instructions retrieved from said non-volatile memory in a DiagRw Address register of said adapter device; and writing said operational programmed instructions retrieved from said non-volatile memory to a DiagRw Data register of said adapter device.

7. The method of claim 3 wherein the step of downloading said data includes the steps of:

writing a load start address of said data retrieved from said non-volatile memory in a DiagRw Address register of said adapter device; and writing said data retrieved from said non-volatile memory to a DiagRw Data register of said adapter device.

8. The method of claim 1 further comprising the steps of:
  detecting an occurrence of a condition that reset said host adapter device; and
  downloading the previously uploaded operational programed instructions from said memory in said motherboard to said host adapter device in response to detecting said condition.

9. A system for booting a host adapter device devoid of dedicated non-volatile program memory, wherein said host adapter device is associated with a motherboard having BIOS code stored in a non-volatile memory, said system comprising:
  means for retrieving operational programmed instructions for said host adapter device from said non-volatile memory device of said motherboard;
  means for downloading said operational programmed instructions from said motherboard to a volatile memory associated with said host adapter device;
  means for commencing operation of said host adapter device executing said operational programmed instructions to thereby boot said host adapter device;
  means for uploading said operational programmed instructions from said volatile memory in said host adapter device to a memory in said motherboard.

10. The system of claim 9 further comprising:
  means for retrieving data associated with said operational programmed instructions from said non-volatile memory device; and
  means for downloading said data from said motherboard to said volatile memory.

11. The system of claim 9 further comprising:
  a PCI bus coupling said host adapter device to said motherboard,
  wherein the means for downloading comprises:
  means for forcing said host adapter device into a diagnostic mode via said PCI bus; and
  means for writing said operational programmed instructions into said volatile memory using direct memory access by said motherboard to said volatile memory via said PCI bus, and
  wherein the means for commencing includes:
  means for releasing said host adapter device from said diagnostic mode via said PCI bus.

12. The system of claim 11
  wherein the means for forcing comprises:
  means for setting a PreventIopBoot bit in a Host Diagnostic Register of said host adapter device;
  means for setting a ResetAdapter bit in the Host Diagnostic Register;
  means for awaiting clearing of the ResetAdapter bit in the Host Diagnostic Register; and
  means for setting a DiagRwEn bit in the Host Diagnostic Register.

13. The system of claim 11 wherein the means for releasing further comprises:
  means for writing an IopResetVectorRegAddr for operation of said operational programmed instructions in a DiagRw Address register of said adapter device;
  means for writing an IopResetVectorValue for operation of said operational programmed instructions in a DiagRw Data register of said adapter device;
  means for clearing the PreventIopBoot bit in the Host Diagnostic Register, and
  means for writing any byte value in a Write Sequence Key field in a Write Sequence register of said adapter device.

14. The system of claim 11
  wherein the means for downloading said operation programmed instructions includes:
  means for writing a load start address of said operational programmed instructions retrieved from said non-volatile memory in a DiagRw Address register of said adapter device; and
  means for writing said operational programmed instructions retrieved from said non-volatile memory to a DiagRw Data register of said adapter device.

15. The system of claim 11
  wherein the means for downloading said data includes:
  means for writing a load start address of said data retrieved from said non-volatile memory in a DiagRw Address register of said adapter device; and
  means for writing said data retrieved from said non-volatile memory to a DiagRw Data register of said adapter device.

16. The system of claim 9 further comprising:
  means for detecting an occurrence of a condition that resets said host adapter device; and
  means for downloading the previously uploaded operational programmed instructions from said memory in said motherboard to said host adapter device in response to detecting said condition.

17. A system comprising:
  a motherboard including a general-purpose processor;
  a nonvolatile memory associated with said motherboard for storing BIOS code to be fetched and executed by said general-purpose processor;
  a host adapter device coupled to said motherboard wherein said host adapter device is devoid of nonvolatile memory used to store operational programmed instructions for processing by said host adapter device;
  operational programmed instructions stored in said nonvolatile memory and used to operate said host adapter device;
  a downloader operable on said motherboard to retrieve said operational programmed instructions from said nonvolatile memory and to download the retrieved operational programmed instructions to said host adapter device; and
  an uploader operable on said motherboard to upload the previously downloaded operational programmed instructions from said host adapter device to a memory associated with said motherboard.

18. The system of claim 17 further comprising:
  a PCI bus coupling said motherboard to said host adapter device.

19. The system of claim 18 wherein said host adapter device is integral with said motherboard.

20. The system of claim 18 wherein said host adapter is a printed circuit board distinct from said motherboard.

* * * * *